US012053836B2

(12) United States Patent
Baumann et al.

(10) Patent No.: US 12,053,836 B2
(45) Date of Patent: Aug. 6, 2024

(54) BEAM SHAPING LASER OPTIC

(71) Applicant: Laserline GmbH, Mülheim Kärlich (DE)

(72) Inventors: Markus Baumann, Mülheim Kärlich (DE); Axel Luft, Mülheim Kärlich (DE)

(73) Assignee: LASERLINE GMBH, Mülheim Kärlich (DE)

( * ) Notice: Subject to any disclaimer, the term of this patent is extended or adjusted under 35 U.S.C. 154(b) by 780 days.

(21) Appl. No.: 17/259,012

(22) PCT Filed: Jul. 9, 2019

(86) PCT No.: PCT/DE2019/200073
§ 371 (c)(1),
(2) Date: Jan. 8, 2021

(87) PCT Pub. No.: WO2020/011315
PCT Pub. Date: Jan. 16, 2020

(65) Prior Publication Data
US 2021/0299784 A1 Sep. 30, 2021

(30) Foreign Application Priority Data
Jul. 10, 2018 (DE) ..................... 10 2018 211 409.9

(51) Int. Cl.
*B23K 26/064* (2014.01)
*B23K 26/06* (2014.01)
(Continued)

(52) U.S. Cl.
CPC ........ *B23K 26/0648* (2013.01); *B23K 26/073* (2013.01); *B23K 26/21* (2015.10);
(Continued)

(58) Field of Classification Search
None
See application file for complete search history.

(56) References Cited

U.S. PATENT DOCUMENTS

| 6,157,492 A | 12/2000 | Yamazaki et al. |
| 2004/0179807 A1 | 9/2004 | Tanaka |
| (Continued) | | |

FOREIGN PATENT DOCUMENTS

| DE | 102015112537 A1 | 1/2017 | |
| DE | 102016015785 A1 * | 5/2018 | ......... G02B 27/0955 |
| EP | 3117950 A1 * | 1/2017 | ......... B23K 26/0604 |

OTHER PUBLICATIONS

Machine translation of EP 3117950 A1, Oct. 2023 (Year: 2023).*
Machine translation of DE102016015785 A1, Oct. 2023 (Year: 2023).*

*Primary Examiner* — Geoffrey S Evans
(74) *Attorney, Agent, or Firm* — McGlew and Tuttle, P.C.

(57) ABSTRACT

Beam-shaping laser optics are provided with a lens field (28) which comprises a plurality of first lenses (32) which are configured and arranged next to one another such that the plurality of first lenses (32) effect a beam shaping in a first direction (y) normal to an optical axis (x), as well as with an individual second lens (30) which is configured such that the individual second lens (30) effects a beam shaping in a second direction (z) normal to the optical axis as well (x) as well as the first direction (y). The lens field (28) and the second lens (30) are arranged in a beam path (12) one after the other along the optical axis (x). A laser system is provided with such beam optics.

20 Claims, 3 Drawing Sheets

(51) Int. Cl.
  *B23K 26/073*  (2006.01)
  *B23K 26/21*  (2014.01)
  *G02B 3/00*  (2006.01)
  *G02B 3/06*  (2006.01)
  *G02B 19/00*  (2006.01)
  *G02B 26/08*  (2006.01)
  *G02B 27/09*  (2006.01)

(52) U.S. Cl.
  CPC ............... *G02B 3/005* (2013.01); *G02B 3/06* (2013.01); *G02B 19/0009* (2013.01); *G02B 19/0047* (2013.01); *G02B 26/0875* (2013.01); *G02B 27/0966* (2013.01)

(56) References Cited

U.S. PATENT DOCUMENTS

| | | |
|---|---|---|
| 2005/0105189 A1 | 5/2005 | Mikhailov |
| 2011/0008973 A1* | 1/2011 | Kawaguchi ........ B23K 26/0738 219/121.75 |
| 2018/0158703 A1* | 6/2018 | Aslanov ............. G02B 19/0009 |

* cited by examiner

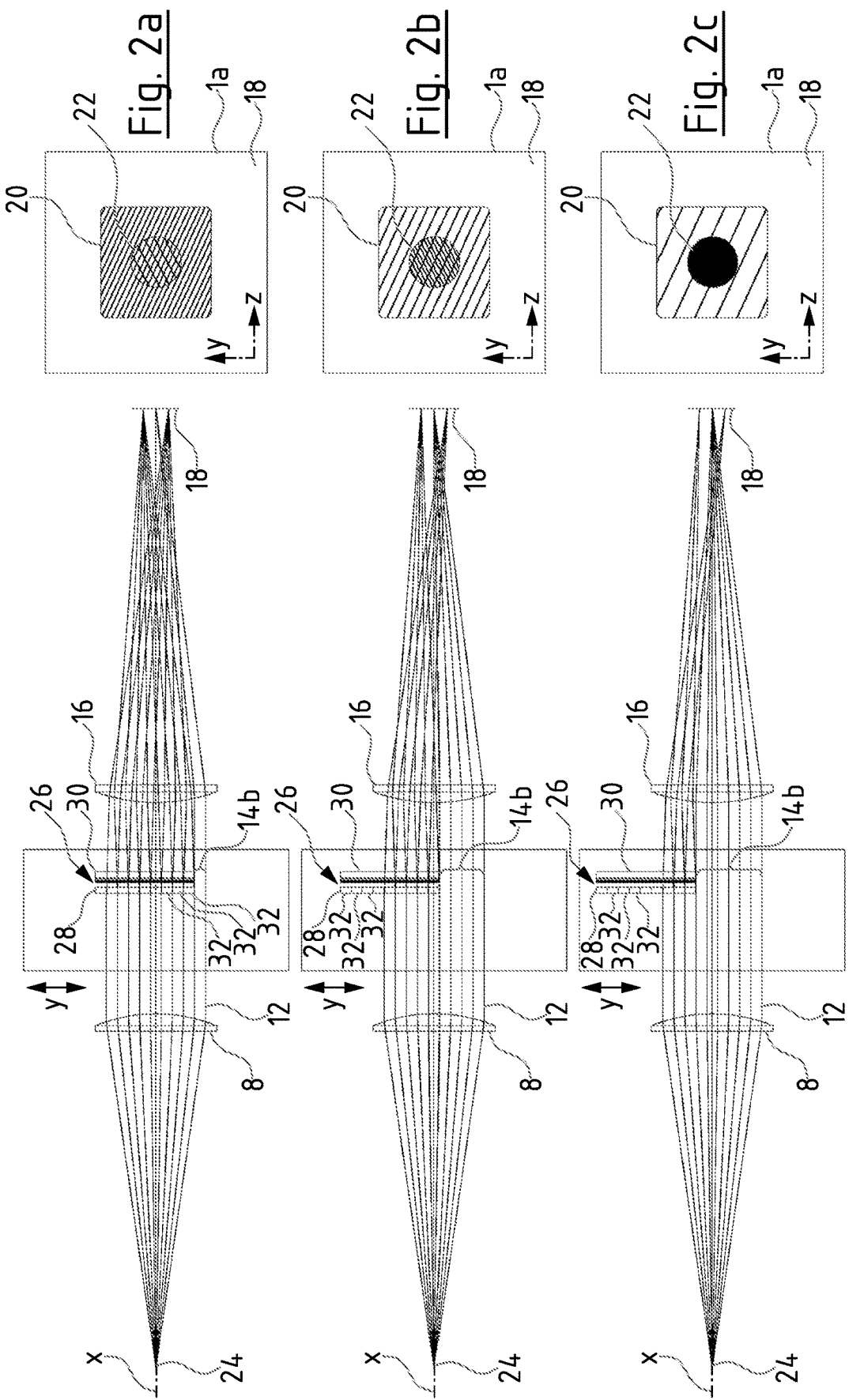

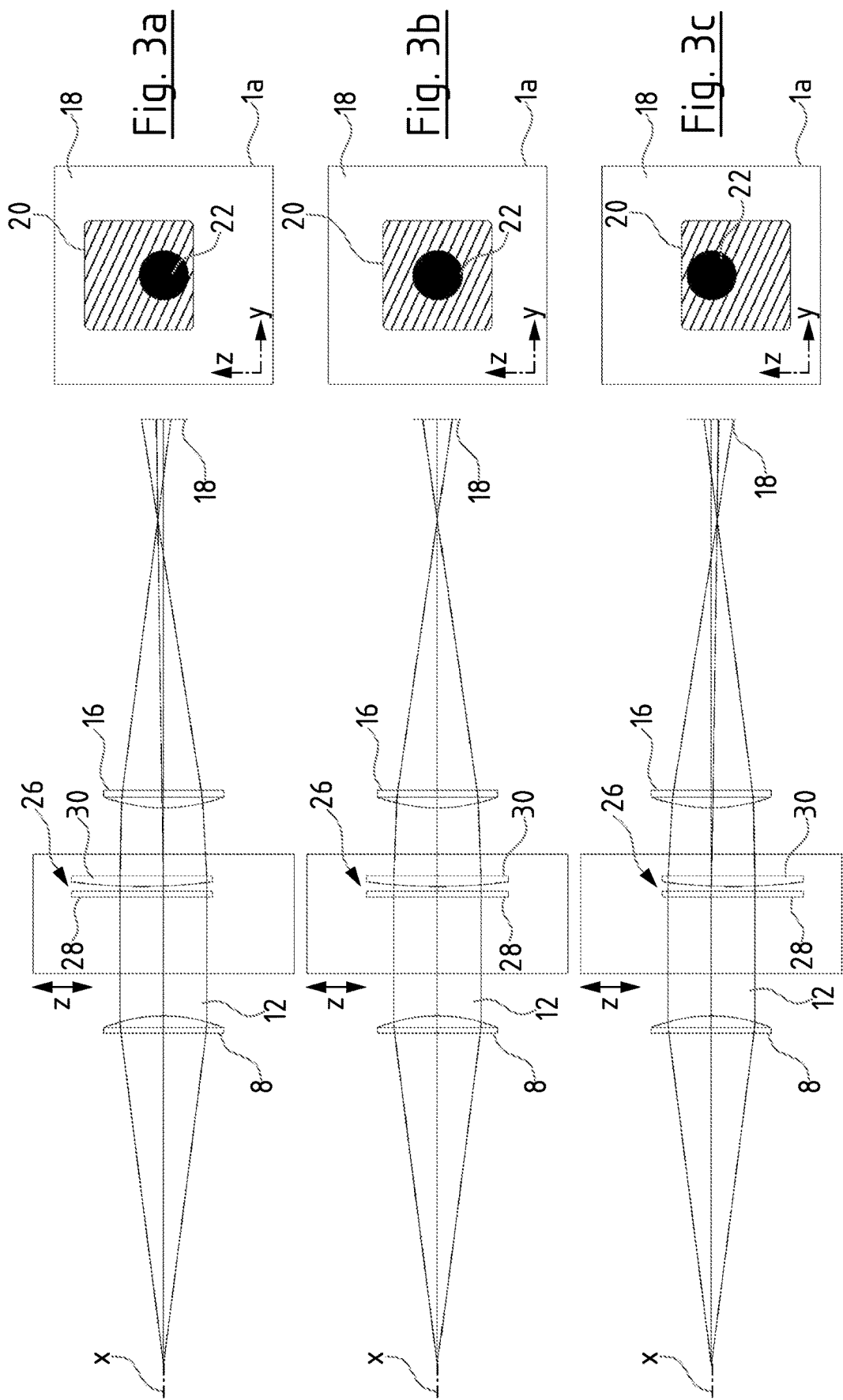

BEAM SHAPING LASER OPTIC

CROSS REFERENCE TO RELATED APPLICATIONS

This application is a United States National Phase Application of International Application PCT/DE2019/200073, filed Jul. 9, 2019, and claims the benefit of priority under 35 U.S.C. § 119 of German Application DE 10 2018 211 409.9, filed Jul. 10, 2018, the entire contents of which are incorporated herein by reference.

TECHNICAL FIELD

The invention relates to beam-forming laser optics.

TECHNICAL BACKGROUND

Such beam-forming laser optics are applied in laser systems for material machining, for example in laser systems for welding or soldering, in order to produce one or more laser points (spots) of a desired shape in a machining plane.

Such laser optics are known for example from DE 10 2015 112 537 A1. The laser optics which are described in this use two fields of cylinder lenses which are ordered in a manner crossed to one another and which shape an essentially rectangular laser point or laser spot from a part of the laser beam. A second part of the laser beam is divided into two round points or spots by way of a wedge element. By way of displacing the optical unit which is formed from the lens fields and the wedge elements, a dividing-up of the power between the individual laser points can be changed. However, the position of the laser points to one another always remains the same.

In order to be able to adapt a laser system to different application scenarios in an improved manner, it can however be desirable to also change the position of several generated laser points to one another.

SUMMARY

With regard to this problem, it is an object of the invention to provide beam-shaping laser optics which permit the generation of several laser points from a laser beam and allow the position of the laser points to one another to be changed.

The beam-shaping laser optics according to the invention are envisaged to be arranged at the exit side of a laser light source, in order to shape the exiting laser beam such that laser points of a desired shape and position can be generated in a machining plane. The laser optics according to the invention comprise a lens field which comprises a plurality of first lenses which are configured and arranged next to one another in a manner such that they effect a beam shaping in a first direction normal to an optical axis. The optical axis is herein the longitudinal direction of the laser optics, parallel to which the beam path runs through the laser optics. The arrangement of several lenses in the lens field has the advantage that a displacement of the lens field does not change the beam shaping which is effected in the first direction by the lens field. This means that the generated geometry of the laser point is not changed in this direction given a displacement of the lens field transversely to the beam path and to the optical axis. According to the invention, a lens is arranged in the provided beam path next to this lens field, wherein this second lens is an second individual lens. This lens is arranged such that it effects a beam shaping in a second direction normal to the mentioned optical axis as well as normal to the described first direction. This means that the lens field and the second lens together effect a beam shaping in two spatial directions which span a plane normal to the mentioned optical axis. Herewith, a laser point which is to be generated in a machining plane can be shaped in two directions. For example, a rectangular and further preferably square laser point can be generated by such a lens arrangement. In order to achieve this, the lens field with the first lenses and the second lens are arranged one after the other along the optical axis in the desired beam path, wherein it is possible to arrange the lens field with the first lenses in the beam path upstream of the second lens or the second lens in the beam path upstream of the lens field. In any case, at least a part of the laser radiation in the beam path runs through the lens field as well as the second lens, in order to realize the shaping of the laser beam in two directions. The use of the individual lens as two as the second lens, by way of the displacement of this lens, renders it possible to displace the laser point which is generated by the lens field and the second lens, in its position.

The described first lenses of the lens field are preferably configured as cylinder lenses which further preferably are all configured identically. In this manner, one can achieve a beam shaping which does not change even with a displacement of the lens field in at least one of the mentioned directions, in particular the first direction. Instead of a lens field with identical a cylinder lenses, cylinder lenses with different focal widths can also be applied in the lens field with the aim of generating different laser spots of a different size which are superimposed on one another. Hence a stepped power density distribution can be generated. In order to retain the power density distribution which is unchanged to the greatest possible extent given a displacement or dislocation of the optics arrangement or of the lens field, the cylinder lenses with different focal widths are preferably distributed symmetrically to the middle of the arrangement. However, it is also possible to distribute the lenses such that a change of the power distribution between the laser spots of a different size is achieved on displacing the optics arrangement. For this, the cylinder lenses of different focal widths can be grouped together in the lens field into individual regions, so that an asymmetrical design of the lens field is created.

The longitudinal axes of the cylinder lenses of the lens field preferably extend parallel to one another and further preferably parallel to the second direction and normally to the optical axis. The longitudinal axes are herein those axes about which the lenses are arcuate.

Cylinder lenses in the context of this invention are to be understood as lenses which preferably have a constant cross section over their longitudinal extension and have at least one preferably convexly curved outer side. Such cylinder lenses do not need to be configured as circular cylinders, but in contrast in cross section can also have the shape of a circle section or segment of a circle or similar shape.

Further preferably, the second lens is configured as a cylinder lens, wherein the longitudinal axis preferably extends in the first direction or parallel to the first direction and normally to be optical axis. This means that the longitudinal axis of the second lens preferably extends normally to the longitudinal axes of the cylinder lenses which preferably form the first lenses in the lens field. By way of this crossed arrangement of the extension directions of the cylinder lenses, one succeeds in the second lens effecting a beam shaping in a direction transversely or at right angles to the direction in which the lens field with the first lenses effects a beam shaping.

Further preferably, the second lens in the first direction has an extension which corresponds at least to the extension of the lens field in this direction. Alternatively or additionally, the second lens can preferably also have an extension in the second direction which corresponds at least to the extension of the lens field in this second direction. By way of this, one succeeds in the lens field and the second lens both covering a common identical cross section of the laser beam and being able to shape this in two directions in the desired manner.

The second lens is usefully configured as a scatter lens which expands the laser beam in the second direction. Such a beam expansion can also alternatively be achieved in the collimated beam by a converging lens. The second lens could hence also be configured as a converging lens. The first lenses of the lens field are preferably configured such they expand the laser beam in the first direction. This too can alternatively be effected by converging lenses/scatter lenses. The lens field can therefore for example linearly expand the laser beam in the first direction, wherein a downstream second lens can then expand this line in the second direction into a rectangular and further preferably square cross section. The second lens can preferably have a greater focal width than the first lenses of the lens field.

According to a further embodiment of the invention, at least one focusing lens is arranged in the beam path downstream of the lens field and the second lens. This focusing lens focuses the laser beam into the machining plane, in order to generate the desired laser points or laser spots there.

According to a further preferred embodiment of the invention, the lens field and the second lens form an optical subassembly which as a whole can be moved normally to the optical axis in the first and/or in the second direction. By way of the movement of this optical assembly, as is described further below, it is possible to shift the intensity and/or the position of the generated laser points (laser spots) to one another. For this, the optical assembly can be fastened to a displacement device which permits a movement or displacement in the first direction and/or the second direction. The displacement device is preferably configured such that a displacing in the first direction is possible independently of the displacing in the second direction. The displacement device can be a purely mechanical displacement device which can be adjusted by hand. However, suitable automated displacement devices, in particular electrically driven displacement devices can also be applied, in order to achieve an adjustability and possible closed loop control of the generated laser points by suitable activation by way of a control device.

Particularly preferably, the mentioned optical assembly is movable relative to the described focusing lens in the first and/or in the second direction normally to the optical axis. Further preferably, the optical assembly is movable relative to a laser beam source and relative to the mentioned optical assembly in the beam path of the optical components which are arranged upstream. This means that the mentioned optical assembly preferably represents a component which can be displaced relative to the remaining optical elements in the beam path transversely to the optical axis, whereas the remaining optical components retain their position in the beam path at least in the direction transverse to the optical axis.

Preferably, the lens field and the second lens, which is to say preferably the previously described optical assembly is arranged in the beam path in a region of collimated radiation. For this, preferably at least one lens or lens group is arranged upstream of the arrangement of the lenses field and the second lens, said at least one lens or lens group collimating the radiation, thus forming a collimator lens which expands the beam path and generates an essentially parallel expanded beam path. The collimated radiation passes through the arrangement of the lens field and the second lens and is then shaped in these in the desired manner, wherein particularly preferably, as explained below, only a part of the collimated radiation is subjected to such a beam shaping.

According to a further embodiment of the invention, the lens field and the second lens are arranged in the beam path in a manner such that in a transverse direction normal to the optical axis and preferably in the first direction which is described above, they only partly cover the beam path. The second lens and the lens field herein preferably cover an identical cross section or an identical share of the beam path, so that this share of the beam path runs through the lens field as well as the second lens, in order to undergo the desired beam shaping. A further part of the beam bundle runs laterally next to the lens field and the second lens, which is to say does not enter through these, so that this part of the beam path is not influenced or changed in its course. This part of the beam path, via the optical components which are arranged upstream or downstream, in particular a collimator lens which is arranged upstream and a focusing lens which is arranged downstream, preferably leads to an imaging of the laser light source or of the exit out of the fiber optic in the machining plane, inasmuch as such is used for feeding the laser radiation. By way of this arrangement therefore, a dividing-up of the beam into two laser points or laser spots is achieved, one which is formed by the lens arrangement and is shaped in the desired manner by the lens field and the second lens, and a point which consists of the imaging of the light source or of the fed light beam. By way of displacing the assembly which is formed from the lens field and the second lens, as has seen described above, the power distribution between the two laser points and their spatial position to one another can be changed.

Further optical elements for generating desired beam shapes can be arranged in that part of the beam path whose cross section is not covered by the lens field and the second lens. Hence further lenses for beam shaping or for example also wedge arrangements for dividing up the beam into several laser spots could be arranged in this region. The most varied of spot geometries and spot numbers can be generated by way of the combination of different beam-shaping elements such as lenses, crossed cylinder lens fields, wedge plates etc. Furthermore, a lateral offset of these laser spots to one another can be realized. By way of the design of the lens field and of the subsequent individual lens in accordance with the invention, herein, the lateral offset between the laser sports or the laser points can be changed by way of displacing the lens arrangement in a first spatial direction, whereas the power distribution between the individual laser spots or laser points can be changed by way of displacing in a direction perpendicular thereto perpendicularly to the optical axis. A position displacement can be achieved by way of the changed position of the apex points of individual cylinder lenses.

Hence the lens field and the second lens are preferably arranged and configured such that they form such an optical assembly which on displacing the optical assembly in the mentioned first direction effects a change of the power division between two laser points which are generated by the optical assembly. This means that hence the dividing-up of the power for example between a rectangular laser point which is shaped by the lenses and a round laser point which consist for example of the imaging of the exit of a fiber optic, can be changed. A displacement of the optical assembly in the mentioned second direction preferably effects a change of the relative position of the two laser points to one another, in particular a lateral change of the position of the preferably rectangular laser spot which is shaped by the lens field and the second lens. In an initial position, these two laser points can be centered to the optical axis. By way of the displacement of the mentioned optical assembly, the laser sport which is shaped by the lens arrangement, formed from the lens field and the second lens, and which can be configured e.g. in a square manner, can be displaced transversely to the optical axis, so that the preferably round laser point or laser spot which is formed from the light bundle which does not run through the lens arrangement continues to be centered to the optical axis. The preferably rectangular laser spot which is shaped from the other part of the beam bundle by the lens arrangement is then offset laterally. Such a design can be advantageous for example for the welding or soldering of asymmetrically formed workpieces.

The described lens field which is formed from the first lenses, and the second lens are preferably configured and arranged such that they generate a rectangular laser point or rectangular spot. This rectangular spot is preferably configured such that in the machining plane it covers a greater area than a second, preferably round laser spot which is produced by the laser radiation which does not run through the optical assembly which is formed by the lens field and the second lens.

Apart from the beam-shaping laser optics which are described above, the subject-matter of the invention is a laser system with a laser light source, for example with one or more laser diodes and with beam-shaping laser optics which have been described above. Inasmuch as this is concerned, the above description is referred to. A fiber optic which leads the laser radiation form the laser light source to the laser optics can be arranged between the laser light source and the laser optics. Particularly preferably, the laser system is configured as a machining system, further preferably for welding and/or soldering.

The invention is described hereinafter by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 2a, 2b, and 2c are schematic sectioned views of the beam-shaping laser optics according to FIG. 1 with three different intensity distributions; and FIGS. 3a, 3b, and 3c are sectioned views of the beam-shaping laser optics according to FIG. 1 and FIG. 2 with three different positionings of two laser spots.

DESCRIPTION OF PREFERRED EMBODIMENTS

Figure 1:
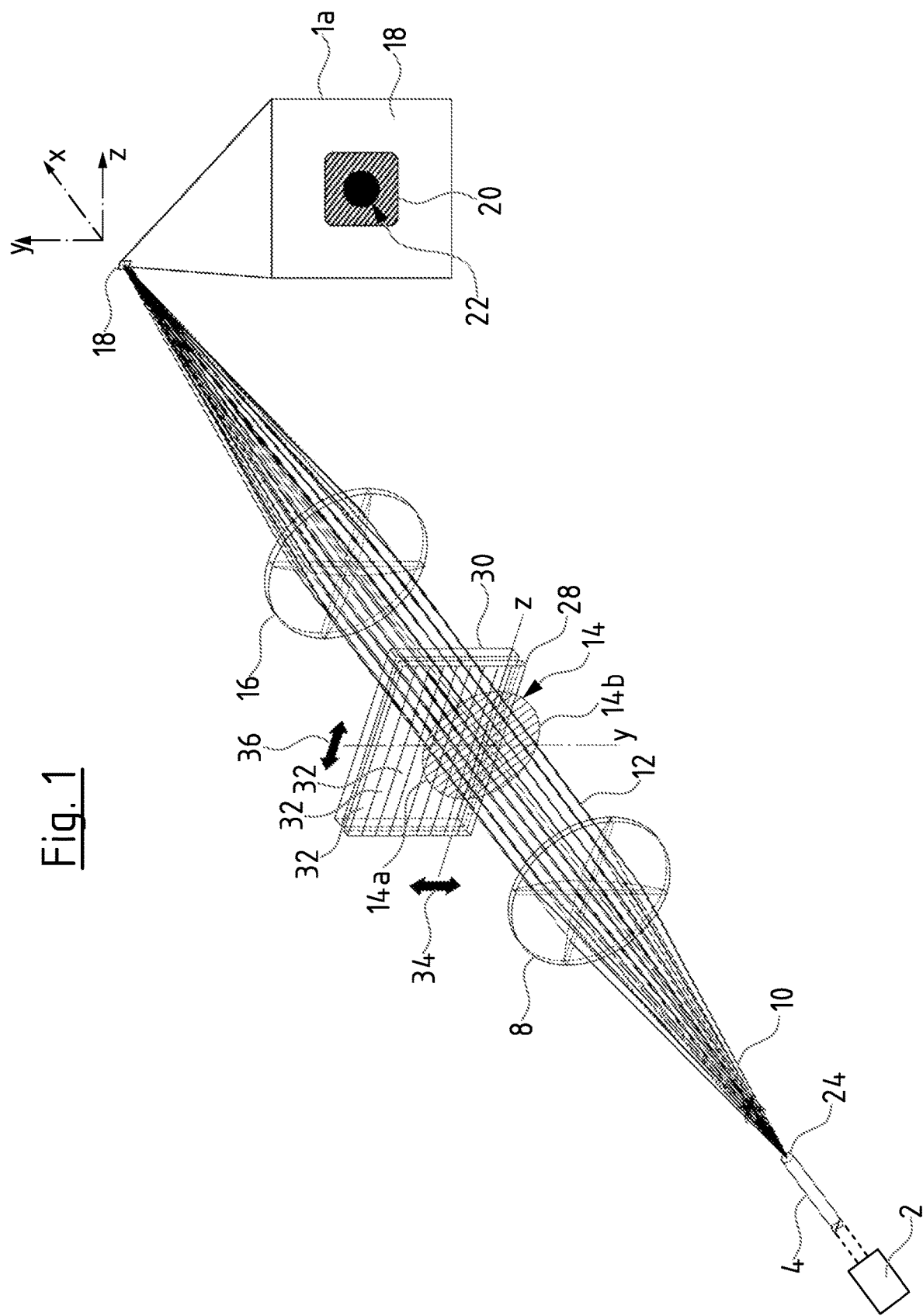
FIG. 1 is a schematic view of a laser system according to the invention, with beam-shaping laser optics according to the invention.

Referring to the drawings, FIG. 1 schematically shows a laser system for material machining with a laser light source 2 as well as with a fiber optic 4 which connects at the exit side and beam-shaping optics 6 which connect into the fiber optic 4. These laser optics 6 at their entry side, which is to say facing the fiber optic 4, comprises a collimator lens 8 which expands the beam 10 exiting out of the fiber optic 4 and provides a collimated radiation 12 at the exit side. The collimated radiation 12 has a cross section or a cross-sectional shape 14 at right angles or normally to the optical an axis x, along which the radiation propagates. A focusing lens which focuses the laser beam and images it in the machining plane 18 is arranged at a distance to the collimator lens 8. The machining plane 18 extends transversely and in particular at right angles to the optical axis x.

In FIG. 1, the beam geometry or the spot geometry is shown in the detail 1a, said geometry being achieved in the machining plane 18. In this case, a first rectangular spot 20 as well as a second round spot 20 is generated and these are superimposed in one another. The superposition here is such that the first spot 20 is centered with the second spot 22 along the optical axis x. The second spot 22 essentially represents an imaging of the end 24 of the fiber optic 4. The rectangular or in this case square first spot 20 is generated by a beam-shaping optical assembly 26 which is arranged in the region of the collimated radiation 12, which is to say between the collimator lens 8 and the focusing lens 16. The optical assembly 26 is arranged such that it only covers a part 14a of the cross section 14, whereas a second part 14b of the cross section 14 is not covered by the assembly 26. In the second region 14b, the collimated radiation 12 laterally passes the optical assembly 26 between the collimator lens 8 and the focusing lens 16 without being influenced by this assembly. The part of the radiation which forms the second section 14b forms the second spot 22. By way of changing the ratio of the sections 14a and 14b, the intensity between the first sport 20 and the second spot 22 can be shifted or changed.

The optical assembly 26 is formed from a lens field 28 and an individual lens 30 which is mounted downstream in the direction of the optical axis x. The lens field 28 is an arrangement of a plurality of cylinder lenses 32 which lie next to one another. The cylinder lenses 32 are all configured identically and with their longitudinal axes, around which they are actuate, extend normally to the optical axis x parallel to the direction z. By way of this arrangement, the cylinder lenses 32 together achieve a beam shaping in the direction of the first direction y normal to the optical axis x and at right angles to the second direction z, parallel to which the longitudinal axes of the cylinder lenses 32 extend. The individual lens 30 is likewise configured as a cylinder lens, but its longitudinal axis runs parallel to the first direction y and therefore normal to the extension direction of the longitudinal axes of the cylinder lenses 32. In this manner, the individual lens 30 achieves a beam shaping in the second direction z, so that by way of superposition and serial arrangement of the lens field 28 and the individual lens 30, as a whole the rectangular or square beam shape of the first spot 20 can be imaged. For this, the cylinder lenses 32 expand the beam or the part-beam which runs through the first section 14a, linearly in a first direction y. The individual lens 32 expands the beam in the second direction z transversely to the expansion by the individual lenses 30. The individual lens 30 and the lens field 28 are fixedly arranged to one another and are commonly movable, as is described hereinafter.

In order to be able to move the optical assembly 26, two displacement devices 34 and 36 which are independent of one another and which are merely represented schematically in FIG. 1 are present. The complete optical assembly 26 can be displaced along the first direction y normally to the optical axis x via the displacement device 34. A displacement in a direction perpendicularly to this, which is to say in the direction of the second direction z normally to the optical axis x can be achieved by the displacement device 36. By way of displacing the optical assembly 26 in the first direction y by way of the displacement device 34 the optical assembly 26 can be brought to overlap with the cross section 14 of the collimated radiation 12 to a different extent. This means that by way of this movement, the ratio of the first section 14a and of the second section 14b of the collimated radiation 12 to one another can be changed. In this manner, the intensity ratio between the first spot 20 and the second spot 22 can be changed, as is shown by way of FIG. 2a to FIG. 2c.

FIG. 2a to FIG. 2c show three different positionings in the y-direction which can be created by way of the displacement device 34. Apart from the sectioned view, yet a representation according to the enlarged detail 1a in FIG. 1 which is to say a plan view of the machining plane 18 in the direction of the optical axis x is shown in FIGS. 2a to 2c. In FIG. 2a, the optical assembly 28 is positioned such that it covers a large part of the cross section 14 of the collimated radiation 12. Hence only a small part of the radiation 12 bypasses the optical assembly 26. This leads to the first laser point or spot 20 having a high intensity in relation to the second laser point or the second spot 22. A positioning concerning which the optical assembly 26 has been moved further out of the collimated radiation 12 is shown in FIG. 2b, so that a greater part of the radiation 12 bypasses the optical assembly 26 without being influenced by this. This means that the section 14b of the cross section 14 of the collimated radiation 12 becomes larger. This leads to the intensity of the firsts spot 20 decreasing and the intensity of the second spot 22 increasing, in comparison to FIG. 2a. In the arrangement according to FIG. 2c, the optical assembly 26 is moved even further out of the cross section of the beam path 12, so that the intensity of the second spot 22 is increased yet again and the intensity of the first spot 20 is further reduced.

As is to be recognized by way of FIG. 2a to FIG. 2c, the displacement of the optical assembly 26 in the first direction y merely leads to a change of the intensity distribution between the first sport 20 and the second spot 22, whereas the geometric positioning of the two spots 20 and 22 remains the same, which means that in this case the both spots 20, 22 remains centered in the y-z plane with respect to the optical axis.

By way of a movement in the second direction z with the help of the displacement device 36, a displacement of the spots 20 and 22 relative to one another can be achieved, as is described by way of FIG. 3a to FIG. 3c. FIG. 3b shows a positioning, concerning which the optical assembly 26 consisting of the lens field 28 and the individual lens 30 are arranged centrally or in a centered manner with respect to the optical axis x. In this position, the first spot 20 and the second spot 22 are likewise centered with respect to the optical axis x, as is also shown in the examples in FIG. 1 (detail 1a) as well as FIG. 2a to FIG. 2c in the plan views upon the machining plane 18. If, departing from this middle position, the optical assembly 26 as is shown in FIG. 3a is displaced in the second direction z (upwards in FIG. 3a), then the first spot 20 is also displaced accordingly in relation to the second spot 22. On displacing in the reverse direction, which is shown in FIG. 3c, (displacement downwards), the first spot 20 displaces accordingly in the reverse direction transversely to the optical axis x. The second spot 22 always remains centered with respect to the optical axis x.

In the example which is shown in FIG. 3a to FIG. 3c, the displacement of the optical assembly 26 in the first direction y is unchanged, so that the intensity distribution between the first spot 20 and the second spot 22 is not changed. However, it is to be understood that the position changes which have been described by way of FIG. 2 and FIG. 3 can also take place or be superimposed simultaneously. Hence a system concerning which the intensity distribution between the two spots 20 and 22 can be changed in a very flexible manner and furthermore the spot 20 can be changed in its position relative to the spot 22 is created. This is particularly advantageous for the welding and soldering of asymmetrical workpieces.

While specific embodiments of the invention have been shown and described in detail to illustrate the application of the principles of the invention, it will be understood that the invention may be embodied otherwise without departing from such principles.

The invention claimed is:

1. Beam-shaping laser optics comprising:
   a lens field comprising a plurality of first lenses which are configured and arranged next to one another to effect a beam shaping in a first direction normal to an optical axis; and
   an individual second lens configured to effect a beam shaping in a second direction normal to the optical axis as well as the first direction, wherein the lens field and the second lens are arranged in a beam path one after the other along the optical axis,
   wherein the lens field and the second lens are arranged in the beam path such that in a transverse direction normal to the optical axis the lens field and the second lens only partly cover the beam path.

2. Beam-shaping laser optics according to claim 1, wherein the first lenses are cylinder lenses.

3. Beam-shaping laser optics according to claim 2, wherein the cylinder lenses are configured identically.

4. Beam-shaping laser optics according to claim 2, wherein a longitudinal axes of the cylinder lenses extend parallel to one another.

5. Beam-shaping laser optics according to claim 4, wherein the longitudinal axes of the cylinder lenses extend parallel to the second direction normally to the optical axis and the longitudinal axis of the cylinder lens extends in the first direction normally to be optical axis.

6. Beam-shaping laser optics according to claim 1, wherein the second lens is a cylinder lens.

7. Beam-shaping laser optics according to claim 1, wherein the second lens, in the first direction, has an extension which corresponds at least to the extension of the lens field in this first direction.

8. Beam-shaping laser optics according to claim 1, wherein second lens is a scatter lens.

9. Beam-shaping laser optics according to claim 1, wherein the second lens has a greater focal width than the first lenses of the lens field.

10. Beam-shaping laser optics according to claim 1, further comprising at least one focussing lens arranged in the beam path downstream of the lens field and the second lens.

11. Beam-shaping laser optics according to claim 10, wherein:
   the lens field and the second lens form an optical assembly which as a whole is configured to be moved in the first direction and/or in the second direction normally to the optical axis; and the optical assembly is movable relative to the focussing lens in the first direction and/or in the second direction normally to the optical axis.

12. Beam-shaping laser optics according to claim 1, wherein the lens field and the second lens form an optical assembly which as a whole is configured to be moved in the first direction and/or in the second direction normally to the optical axis.

13. Beam-shaping laser optics according to claim 1, wherein the lens field and the second lens are arranged in the beam path in a region of collimated radiation.

14. Beam-shaping laser optics according to claim 1, wherein the lens field and the second lens form an optical assembly wherein at a displacement of the optical assembly in the first direction effects a change of an intensity distribution between two laser points which are generated by the optical assembly, and a displacement of this optical assembly in the second direction effects a change of a position of the two laser points relative to one another.

15. Beam-shaping laser optics according to claim 1, wherein the lens field and the second lens are configured and arranged such that the lens field and the second lens generate a rectangular spot.

16. Beam-shaping laser optics according to claim 1, further comprising a collimator lens and a focusing lens, wherein the beam path extends from the collimator lens to the focusing lens and wherein the lens field and the second lens are arranged between the collimator lens and a focusing lens and in cooperation with the collimator lens and a focusing lens form a beam path configuration whereby a portion of the beam path is not influenced by the lens field and the second lens.

17. A laser system comprising:
a laser light source; and
beam-shaping laser optics comprising:
    a lens field comprising a plurality of first lenses which are configured and arranged next to one another to effect a beam shaping in a first direction normal to an optical axis; and
    an individual second lens configured to effect a beam shaping in a second direction normal to the optical axis as well as the first direction, wherein the lens field and the second lens are arranged in a beam path of the laser light source, one after the other along the optical axis,
wherein the lens field and the second lens are arranged in the beam path such that in a transverse direction normal to the optical axis the lens field and the second lens only partly cover the beam path.

18. A laser system according to claim 17, wherein the laser system is configured as a machining system for welding or soldering.

19. A laser system according to claim 17, further comprising a fiber-optic arranged between the laser light source and the laser optics.

20. A laser system according to claim 17, wherein the beam-shaping laser optics further comprises a collimator lens and a focusing lens, wherein the beam path extends from the collimator lens to the focusing lens and wherein the lens field and the second lens are arranged between the collimator lens and a focusing lens and in cooperation with the collimator lens and a focusing lens form a beam path configuration whereby a portion of the beam path is not influenced by the lens field and the second lens.

\* \* \* \* \*